US012769020B2

(12) United States Patent
Almeida Gomes De Moura et al.

(10) Patent No.: US 12,769,020 B2
(45) Date of Patent: Oct. 20, 2026

(54) ACOUSTIC ROAD NOISE REMOVAL BY ADAPTIVE FILTERING OF MODELED GUIDED WAVES

(71) Applicant: Halliburton Energy Services, Inc., Houston, TX (US)

(72) Inventors: Francisco Alirio Almeida Gomes De Moura, Rio de Janeiro (BR); Eduardo Alves Da Silva, Rio de Janeiro (BR); Rafael March Castaneda Neto, Rio de Janeiro (BR); Yadong Wang, Singapore (SG); Mahmoud Saada, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 163 days.

(21) Appl. No.: 18/811,305

(22) Filed: Aug. 21, 2024

(65) Prior Publication Data

US 2025/0314795 A1 Oct. 9, 2025

Related U.S. Application Data

(60) Provisional application No. 63/574,415, filed on Apr. 4, 2024.

(51) Int. Cl.
*G01V 1/50* (2006.01)
*G01V 1/18* (2006.01)
(Continued)

(52) U.S. Cl.
CPC ................ *G01V 1/50* (2013.01); *G01V 1/186* (2013.01); *H04R 1/44* (2013.01); *H04R 3/04* (2013.01)

(58) Field of Classification Search
CPC . G01V 1/50; G01V 1/46; G01V 1/186; H04R 1/44; H04R 3/04
See application file for complete search history.

(56) References Cited

U.S. PATENT DOCUMENTS 4,114,721 A 9/1978 Glenn, Jr.
4,353,122 A 10/1982 Cubberly, Jr.
(Continued)

FOREIGN PATENT DOCUMENTS

BR PI0611826-7 B1 9/2022

OTHER PUBLICATIONS

English abstract of BRPI0611826-7; retrieved from www.espacenet.com on Aug. 20, 2024.
(Continued)

*Primary Examiner* — Abdallah Abulaban
*Assistant Examiner* — Amie M Ndure
(74) *Attorney, Agent, or Firm* — NOVAK DRUCE CARROLL LLP

(57) ABSTRACT

A hydrophone may be deployed in a wellbore to collect sounds that may be used to identify whether a wellbore is safe to operate. This hydrophone may include acoustic sensors that sense noise generated by motion of the hydrophone and may sense noise indicative of a defect that could lead to catastrophic failure of a wellbore. Noise generated by movement of the hydrophone may be classified as "road noise" and noise associated with wellbore defects may be classified being "signals of interest." The presence of "road noise" may interfere with the collection of "signals of interest" and because of this, evaluations performed on data that includes "road noise" may result in inaccurate determinations and a decrease in safety. As such, systems and methods of the present disclosure are directed to improving
(Continued)

safety of a wellbore by removing "road noise" more effectively while increasing quality of "signals of interest."

20 Claims, 11 Drawing Sheets

(51) Int. Cl.
*H04R 1/44* (2006.01)
*H04R 3/04* (2006.01)

(56) References Cited

U.S. PATENT DOCUMENTS

| | | | | |
|---|---|---|---|---|
| 5,151,882 | A | 9/1992 | Kingman | |
| 6,956,790 | B2 | 10/2005 | Haldorsen | |
| 11,460,443 | B2 * | 10/2022 | Al-Huwaider | G01N 29/348 |
| 11,746,644 | B2 * | 9/2023 | Wang | E21B 47/005 73/588 |
| 2009/0207698 | A1 * | 8/2009 | Kitchin | G01V 1/186 367/173 |
| 2010/0254218 | A1 * | 10/2010 | Dorovsky | G01V 11/007 367/140 |
| 2011/0242943 | A1 * | 10/2011 | Klinge | H04R 1/44 367/141 |
| 2015/0322782 | A1 * | 11/2015 | Khajeh | E21B 49/08 175/48 |
| 2021/0033742 | A1 * | 2/2021 | Topping | G01V 1/46 |
| 2021/0109243 | A1 * | 4/2021 | Ge | G01V 1/52 |
| 2021/0123338 | A1 * | 4/2021 | Steel | E21B 33/134 |
| 2021/0238989 | A1 | 8/2021 | Ang et al. | |
| 2022/0260530 | A1 * | 8/2022 | Al-Huwaider | G01F 1/74 |
| 2022/0413176 | A1 * | 12/2022 | Padhi | G01V 1/284 |
| 2023/0314648 | A1 | 10/2023 | Wang et al. | |

OTHER PUBLICATIONS

International Search Report & Written Opinion; PCT Application No. PCT/US2024/045116; mailed Dec. 16, 2024.

Yang, Qinshan et al., "Downhole Leak Detection: Introducing A New Wireline Array Noise Tool", SPE-194264-MS; Society of Petroleum Engineers, Mar. 2019.

* cited by examiner

ACOUSTIC ROAD NOISE REMOVAL BY ADAPTIVE FILTERING OF MODELED GUIDED WAVES

CROSS-REFERENCE TO RELATED APPLICATIONS

This application claims priority benefit to U.S. provisional patent application No. 63/574,415, filed Apr. 4, 2024 and entitled "ACOUSTIC ROAD NOISE REMOVAL BY ADAPTIVE FILTERING OF MODELED GUIDED WAVES," the disclosure of which is incorporated by reference herein.

TECHNICAL FIELD

The present disclosure is generally directed to improving determinations made from collected data such that a wellbore may be operated more safely. More specifically, the present disclosure is directed to removing noise generated by motion of an acoustic device when the acoustic device is deployed in a wellbore.

BACKGROUND

Acoustic devices such as hydrophones may be deployed in a wellbore to collect sounds that may be used to identify whether a wellbore is safe to operate. An array of hydrophones typically includes many acoustic sensors that act similar to an array of water resistant microphones. Motion of the hydrophones may itself generate noise that obfuscate other sounds that are indicative of safe wellbore operation. Since the noise generated by motion of the hydrophone may obfuscate noises that may be critical to safe wellbore operation, simply deploying a hydrophone in a wellbore, collecting data, and making determinations regarding the wellbore using that collected data may result in incorrect determinations being made and a reduction in safety.

BRIEF DESCRIPTION OF THE DRAWINGS

In order to describe the manner in which the features and advantages of this disclosure can be obtained, a more particular description is provided with reference to specific implementations thereof which are illustrated in the appended drawings. Understanding that these drawings depict only exemplary implementations of the disclosure and are not therefore to be considered to be limiting of its scope, the principles herein are described and explained with additional specificity and detail through the use of the accompanying drawings in which.

DETAILED DESCRIPTION

Figure 1A:
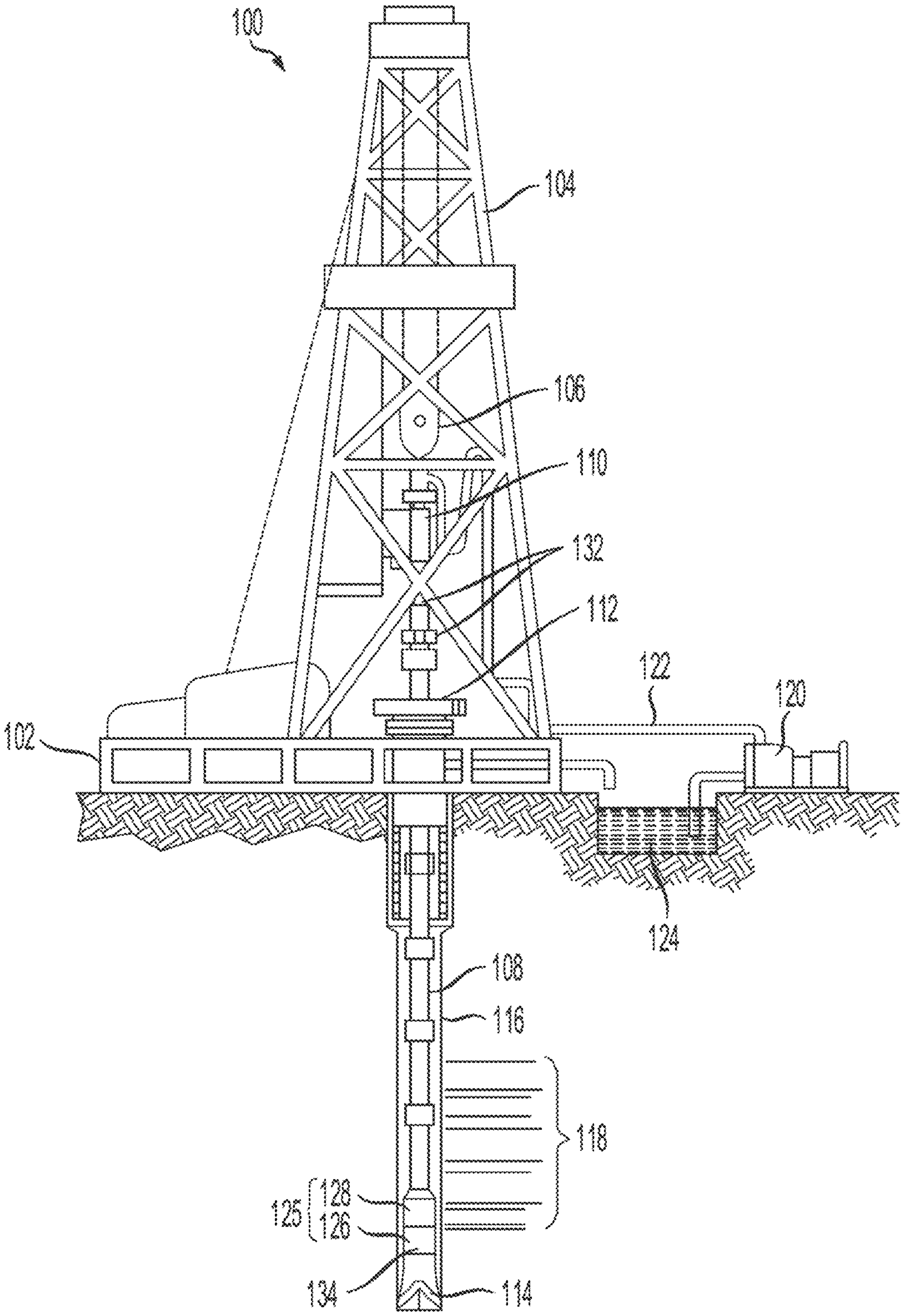
FIG. 1A is a schematic diagram of an example logging while drilling wellbore operating environment, in accordance with various aspects of the subject technology.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous compounds. In addition, numerous specific details are set forth in order to provide a thorough understanding of the methods and apparatus described herein. However, it will be understood by those of ordinary skill in the art that the methods and apparatus described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the present disclosure.

A hydrophone assembly may be deployed in a wellbore to collect sounds that may be used to identify whether a wellbore is safe to operate. This hydrophone assembly may include acoustic sensors (e.g., numerous individual hydrophones) that sense noise generated by motion of the hydrophone assembly and may sense noise indicative of a defect that could lead to catastrophic failure of a wellbore. Noise generated by movement of the hydrophone may be classified as "road noise" and noise associated with wellbore defects may be classified being "signals of interest." The presence of "road noise" may interfere with the collection of "signals of interest" and because of this, evaluations performed on data that includes "road noise" may result in inaccurate determinations and a decrease in safety. As such, systems and methods of the present disclosure are directed to improving safety of a wellbore by removing "road noise" more effectively while increasing quality of "signals of interest."

When a tool or assembly that includes an array of hydrophones (a hydrophone assembly) is deployed in a wellbore, bumpers of that assembly may generate noise when they rub against or bump into structures inside of the wellbore. When rubbing or bumping occurs, noise generated by that rubbing or bumping may propagate along sidewalls of structures of the wellbore where sensors (e.g., microphones) included in the hydrophone assembly sense that noise as it moves at the speed of sound. For example, when a hydrophone assembly is lowered into a tube located in a wellbore, the bumpers may rub against sidewalls of the tube and may impact (bump into) side walls of the tube. Noise generated by such rubbing or bumping may be referred to as "road noise."

Hydrophone assemblies include sensors that sense noise when the hydrophone assembly is deployed in a wellbore to collect data from which conditions of the wellbore (e.g., the movement of fluids) or faults that may be located within wellbore structures may be identified. Such conditions or faults may be referred to as "sounds of interest." In certain instances, a hydrophone assembly may be used to identify specific defects in manmade structures, for example, cracks that cause fluids to leak. Such faults may result in cracks in a wellbore tube or casing expanding and this may lead to catastrophic failure of a wellbore. Hydrophone assemblies include sensors that sense sounds of virtually any sort that are generated within the wellbore. Sounds that are associated with movement of a hydrophone assembly may be classified as "road noise" and sounds generated by leaks or motion of fluids in the wellbore environment may be classified as "sounds of interest." Such "sounds of interest may be referred to herein as "noises of interest" or "signals of interest." Since road noise (sounds generated by movement of a tool in the wellbore) may interfere with "signals of interest," determinations made based on "signals of interest" may be error prone. As such, methods of the present disclosure are directed to attenuating or reducing the effects of "road noise" in a set of collected data such that more accurate determinations may be made regarding specific "signals of interest." In certain instances, "signals of interest" or "road noise" may be synthetically generated based on work performed by engineers or based on noises generated in a laboratory environment. Such synthetic noise or actual recordings may be used to train and refine the operation of a computer model.

This means that noise generated by movement of the tool may mask or obscure (obfuscate) noise generated by fluid motion or defects in manmade structures of the wellbore. As such, "road noise" is not a "noise of interest" to those who manage operations of a wellbore. Methods and apparatus discussed herein may be referred to as "systems and techniques" of the present disclosure. These "systems and techniques" may be used to attenuate road noise (noise generated by motion of the tool in the wellbore) while preserving sounds of interest.

FIG. 1A is a schematic diagram of an example logging while drilling wellbore operating environment, in accordance with various aspects of the subject technology. The drilling arrangement shown in FIG. 1A provides an example of a logging-while-drilling (commonly abbreviated as LWD) configuration in a wellbore drilling scenario 100. The LWD configuration can incorporate sensors (e.g., EM sensors, seis mic sensors, gravity sensor, image sensors, etc.) that can acquire formation data, such as characteristics of the formation, components of the formation, etc. For example, the drilling arrangement shown in FIG. 1A can be used to gather formation data through an imager tool (not shown) as part of logging the wellbore using the imager tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As drill bit 114 extends into the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the imager tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission (e.g., using mud pulse telemetry, EM telemetry, or acoustic telemetry). In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
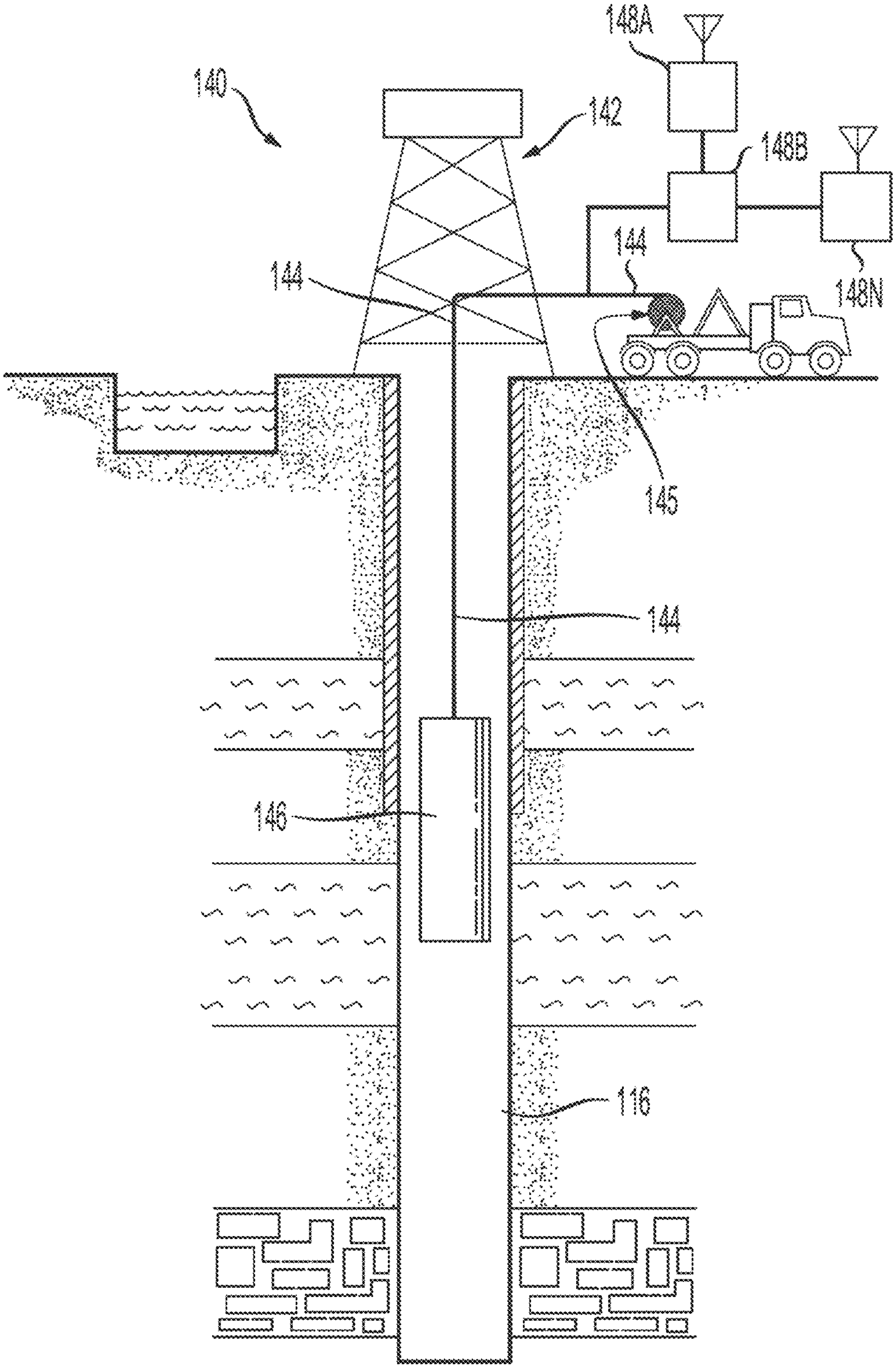
FIG. 1B is a schematic diagram of an example downhole environment having tubulars, in accordance with various aspects of the subject technology.

FIG. 1B is a schematic diagram of an example downhole environment having tubulars, in accordance with various aspects of the subject technology. In this example, an example system 140 is depicted for conducting downhole measurements after at least a portion of a wellbore has been drilled and the drill string removed from the well. An imager tool (not shown) can be operated in the example system 140 shown in FIG. 1B to log the wellbore. A downhole tool is shown having a tool body 146 in order to carry out logging and/or other operations. For example, instead of using the drill string 108 of FIG. 1A to lower the downhole tool, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the imager tools described herein.

The illustrated wireline conveyance 144 provides power and support for the tool, as well as enabling communication between data processors 148A-N on the surface. In some examples, wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via wireline conveyance 144 to meet power requirements of the tool. For slickline or coiled tubing configurations, power can be supplied downhole with a battery or via a downhole generator.

Figure 2:
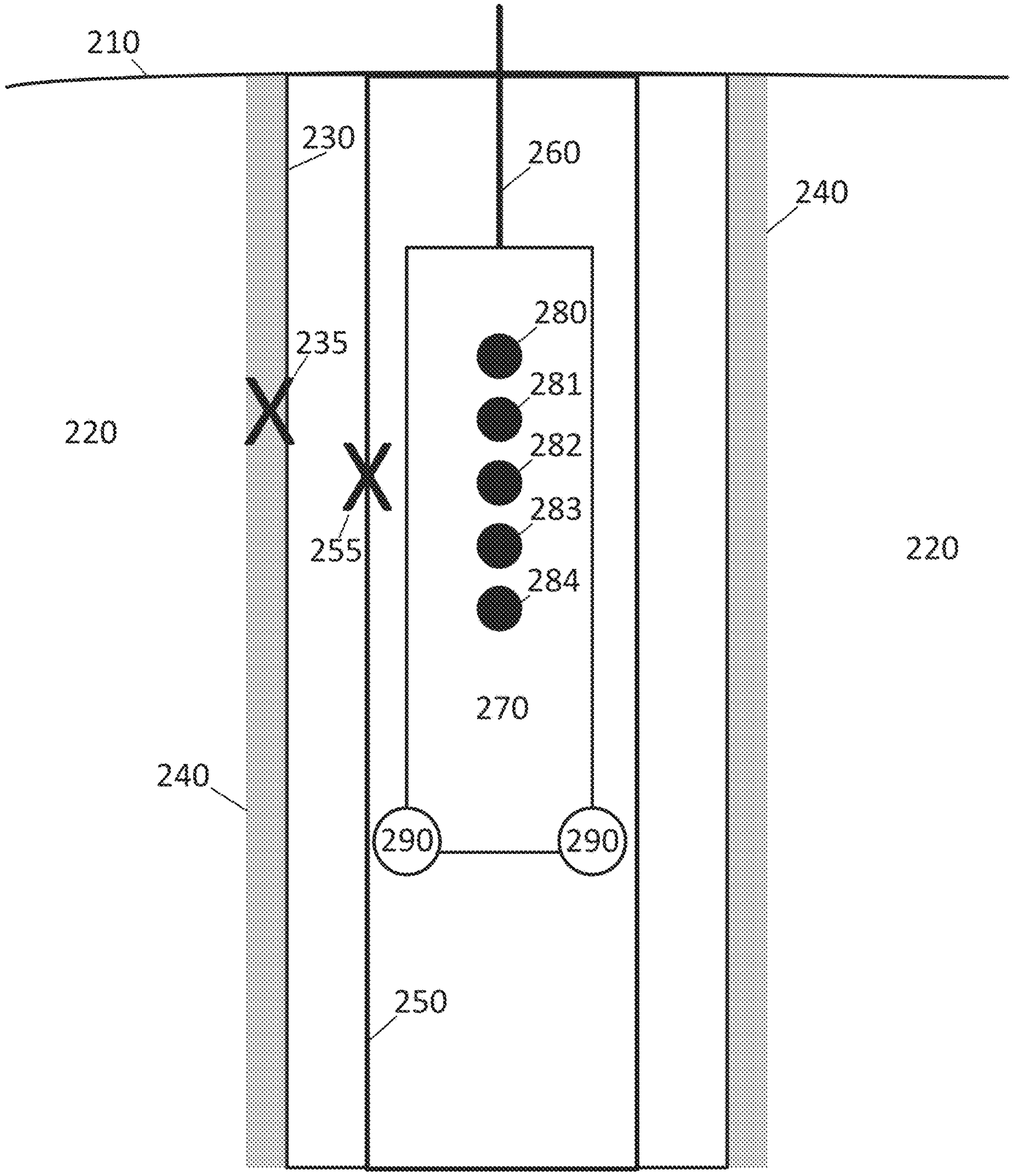
FIG. 2 illustrates a hydrophone assembly that is being deployed in a wellbore, in accordance with various aspects of the subject technology.

FIG. 2 illustrates a hydrophone assembly that is being deployed in a wellbore. FIG. 2 includes casing 230 cemented into a wellbore with cement 240, tube 250 that is deployed in casing 230, and hydrophone assembly 270. Hydrophone assembly 270 includes a plurality of sensors/microphones (280, 281, 282, 283, and 284), and bumpers 290. Deployment cable 260 may be used to lower hydrophone assembly 270 into the wellbore casing 230. FIG. 2 also includes ground surface 210 and subterranean strata 220 located below the surface of the ground 210.

When hydrophone assembly 270 is lowered into the wellbore casing 230, bumpers 290 may rub against or bump into tube 250 and this rubbing and bumping may generate noise characteristic of hydrophone assembly moving within tube 250. The noise generated by this rubbing or bumping may be referred to as "road noise." Road noise generated by motion of the hydrophone assembly 270 may travel along the walls of tube 250 at the speed of sound toward sensors (280, 281, 282, 283, and 284). Sensors 280, 281, 282, 283, and 284 may each of these sensors may respectively sense the road noise that is shifted in time. Since sensor 284 is closest to bumper 290 and since each of the other sensors (281, 282, 283, and 284) are located farther from bumper 290, the road noise will be sensed by sensor 284 first and then respectively by sensor 283, 282, 281, and 280. Measures of time that the road noise is shifted may vary based on the speed of sound and distances that separate each respective sensor. While bumpers 290 are illustrated at a lower end of hydrophone assembly 270, other bumpers may be located at an upper end of the hydrophone assembly.

Sound traveling from a sound source along the tube or other structure (e.g., the casing) may travel within the wall of the tube 255 or other structure, may travel in a fluid medium adjacent to the tube or other structure, or may travel through both. When the hydrophone assembly is deployed in a wellbore, sounds sensed by sensors of the hydrophone assembly may be used to detect sounds that are associated with a wellbore defect. A defect (e.g., a crack) in a tube 250 (defect 255) or in a casing 230 (defect 235) of the wellbore may generate sounds as fluids leak through such defects. FIG. 2 includes two different defects, identified with X marks, a first defect 235 may be a crack in cement 240 and in casing 230, and a second defect 255 may be a crack in tube 250. Since sensors 280, 281, 282, 283, and 284 of hydrophone assembly 270 may sense noise from a leak and sense road noise at the same time, techniques that effectively filter out or that suppress (attenuate) road noise allow for determinations relating to defects to be identified more easily.

Noise traveling from a bottom portion of hydrophone assembly 270 (e.g., road noise) will travel upward toward the array of sensors (280, 281, 282, 283, and 284) of hydrophone assembly 270 at the speed of sound. This means that each of the sensors (280, 281, 282, 283, and 284) will sense the road noise at different times and that signals generated by receipt of the road noise by the sensors will be offset in time. The timing offsets are a function of the speed of sound. To some extent, the same may be true for sounds generated by leaks in a tube or other wellbore structure. Since defect 255 is located near a center portion of the array of hydrophone sensors (280, 281, 282, 283, and 284), sounds associated with such leaks will not be offset in the same direction as sounds that propagate from one end of hydrophone assembly 270 to another end hydrophone assembly 270. Since defect 255 is located in the middle of the sensor array, sound generated by fluids leaking through defect 255 will first be received by sensor 282, after which sensors 281 and 283 will receive the leaking sound, and then the leaking sound will be received by sensors 280 and 284. As such, some sound energy from defect 255 travels upward and some sound energy from defect 255 travels downward.

Based on the position of defect 235 relative to the location of hydrophone assembly 270, leaking sounds received by the sensors of the hydrophone assembly will be received in the following order: first sensor 281 will receive the leaking sound, then sensors 280 and 282 will receive the leaking sound, next sensor 283 will receive the leaking sound, and then sensor 284 will receive the leaking sound.

This means that road noise received by the sensors (280, 281, 282, 283, and 284) may always be shifted in time in the same direction while some portion of sounds of interest from a source next to the hydrophone assembly 270 may travel in opposite directions. In instances when bumpers are located at the top of hydrophone assembly 270, road noise may travel from an upper portion of the hydrophone assembly toward the bottom of the hydrophone assembly.

Figure 3:
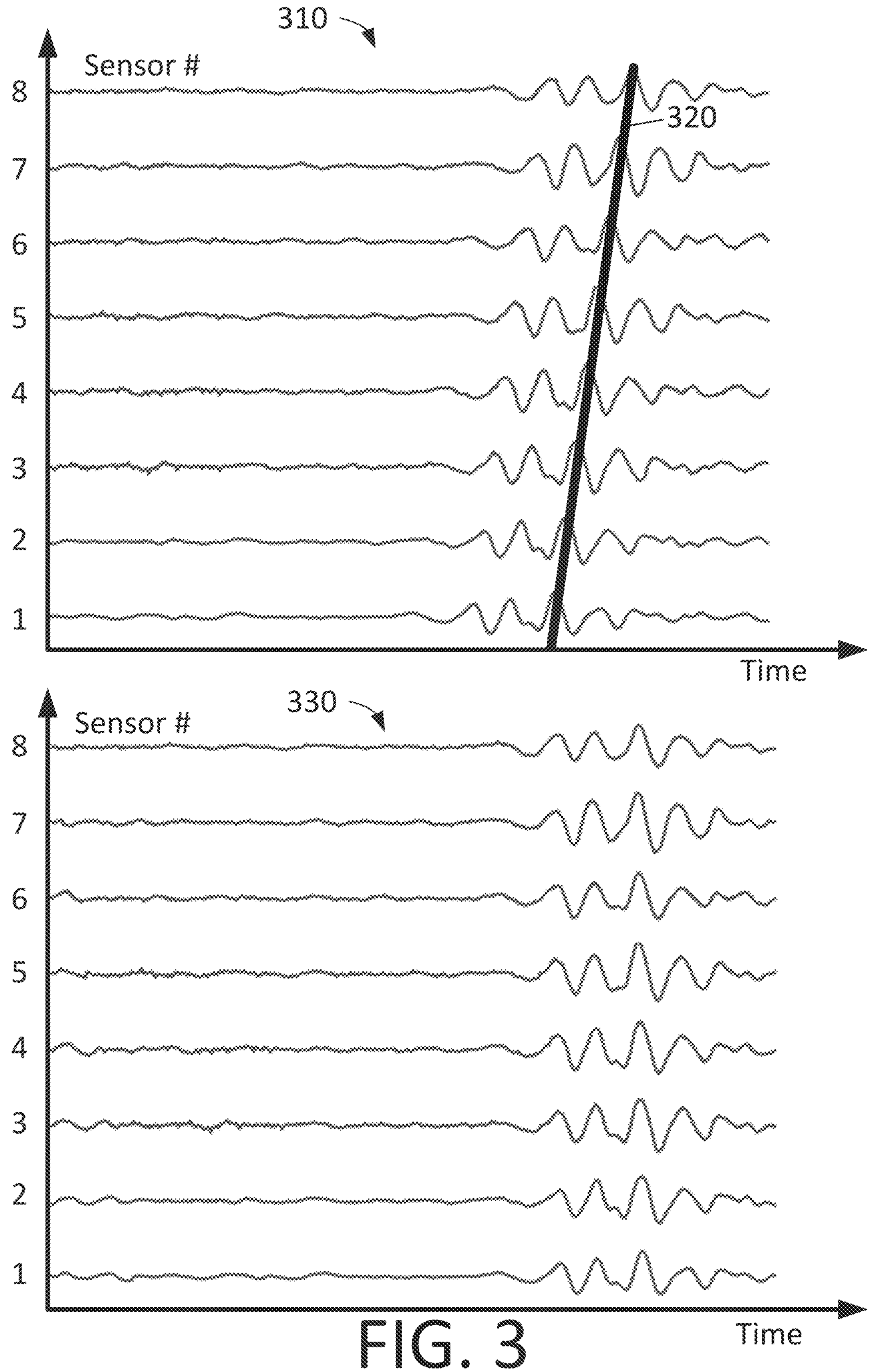
FIG. 3 includes a first graph of signals received by different sensors of a hydrophone assembly at different times and includes a second graph that includes a second image of the signals after they have been shifted in time, in accordance with various aspects of the subject technology.

FIG. 3 includes a first graph of signals received by different sensors of a hydrophone assembly at different times and includes a second graph that includes a second image of the signals after they have been shifted (aligned) in time. Each of these graphs include waveforms sensed by a particular sensor (1 through 8) of the hydrophone assembly. The upper graph 310 shows road noise signals that were received at different times by each respective sensor 1 through 8 of the hydrophone assembly. The lower graph 330 shows the same road noise signals aligned in time. The vertical axis of graphs 310 and 330 corresponds to sounds sensed by each respective sensor 1 through 8, and the horizontal axis corresponds to time. Timing offsets between sounds sensed by sensors 1 through 8 of graph 310 correspond to the slope of line 320. Line 320 passes through a specific peak in the sound sensed by sensors 1 through 8. When each of sensors 1 through 8 are equally spaced apart by a separation distance along the length of the hydrophone assembly, the velocity of the signal corresponds to the separation distance divided by the time shift between each different signal. This means that the slope of line 320 corresponds to the speed of sound traveling from a sound source to the sensors of the hydrophone assembly. Graph 330 includes the same road noise signals as graph 310, yet here the signals are aligned in time.

Methods of the present disclosure may sum signal amplitudes of signals sensed by each of the respective sensors (e.g., sensors 1 through 8) after each of these signals have been shifted based on an assumption of the speed of sound. Such sums may be performed using different estimates of the speed of sound. Sums calculated based on each of the different speed estimates may be compared and a sum that has a highest (maximum) value may be used to identify the speed of sound for conditions when the sound signals were collected.

The steps of time shifting and summing may be performed because the speed of sound may vary with wellbore conditions and fluids that may be in the wellbore. For example, the speed of sound may vary with temperature, a type of fluid included in a wellbore casing or tube, and characteristics of the casing or the tube. As such, a first estimate of the speed of sound may be close to the actual speed of sound because the estimate corresponds to known characteristics of wellbore structures (e.g., casings, tubes) and fluids in the wellbore. By shifting the waveforms by different time offsets and summing the resultant signals together, the actual speed of sound may be determined. Since the waveforms of FIG. 3 are representations of sound sensed by a sensor of the hydrophone assembly, each of the signals represent energy of the sound sensed by each of the sensors of the hydrophone assembly. As such, the maximum sum of time shifted signals corresponds to a maximum energy and this maximum energy may be used to identify the speed of sound.

Hydrophone assemblies may include bumpers that are located at both an upper and a lower end of that assembly. When this is true, road noise generated by those bumpers bumping or dragging along a wellbore structure (e.g., a wellbore tube or wellbore casing) will either move from the lower end of the hydrophone assembly toward the upper end of the hydrophone assembly or visa versa (from the upper end to the lower end of the hydrophone assembly). The timing offsets used to align the signals in graph 330 may be referred to as a set of curves or data that is associated with a wavenumber (k) of zero (or k=0) when the data is aligned by shifting data from each hydrophone by the corresponding inclination of the wave speed such that the time of arrival coincides for all of them, and converted to the frequency-wavenumber (FK) domain via a 2-dimensional Fourier transform. In certain instances, the FK domain may correspond to a domain that corresponds to both frequency and wavenumber (e.g., inclination or slope) or traveling acoustic waves.

Alternatively, or additionally, transformations may transform data into a domain referred to as a Radon domain where data is decomposed into components of inclination. Other possible transformations could include a Wavelet transform that decomposes data into time scales or Curvelet transforms that may include components of frequency, localization (wellbore area or zone), and slopes of wave packets/propagation.

Figure 4:
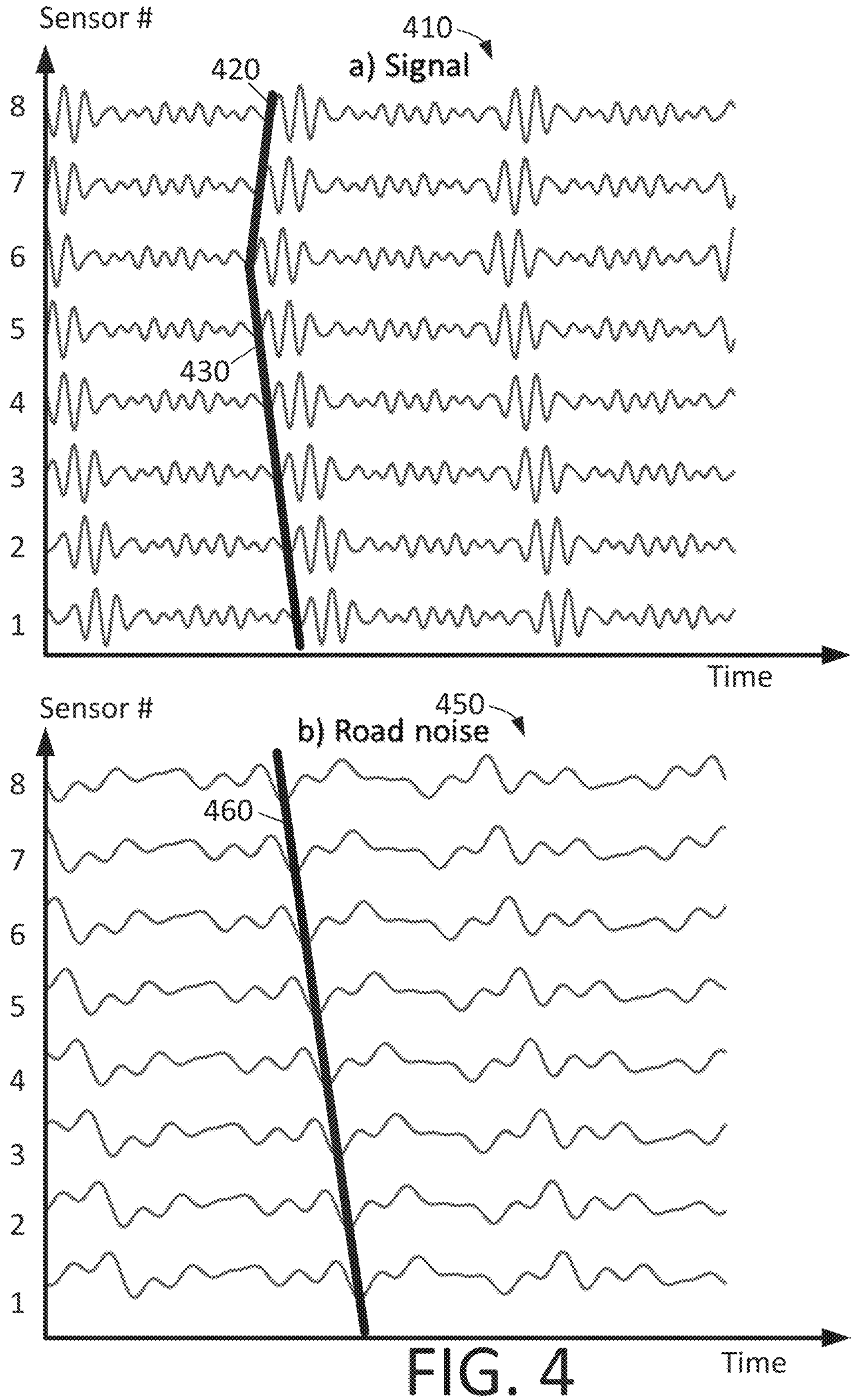
FIG. 4 includes a first graph that shows signals of interest received at a hydrophone assembly and includes a second graph that shows unwanted road noise signals received at the hydrophone assembly, in accordance with various aspects of the subject technology.

FIG. 4 includes a first graph that shows signals of interest received at a hydrophone and includes a second graph that shows road noise signals received at the hydrophone assembly. Like the graphs of FIG. 3, the first graph 410 and the second graph 450 includes a vertical axis that identifies respective sensors and a horizontal axis of time. While not illustrated in FIG. 4, the signals of interest and the road noise signals may be received at the same time by sensors of the hydrophone assembly. When the signals of interest and the road noise signals are received by these different hydrophone sensors at the same time, resultant waveforms are a combination of the signals of interest in graph 410 and the road noise signals in graph 450.

Graph 410 includes lines 420 and 430 that have different slopes that correspond to sound traveling from a noise source to respective sensors of the hydrophone assembly. Line 420 has a positive slope and line 430 has a negative slope. In an instance when the lower numbered sensors (e.g., sensor #1) is located farther into a wellbore (at a greater depth) than the higher numbered sensors (e.g., sensor #8), a positive slope corresponds to sound moving up the wellbore (in a first direction). In such an instance, a negative slope corresponds to sound moving down the wellbore (in a second direction). Since the slope of lines 420 and 430 change at sensor number 6, sensor number 6 must be the closest sensor to a source of the signals of interest (a noise source of interest).

As mentioned above, graph 450 of FIG. 4 illustrates road noise signals received at different sensors of the hydrophone assembly. These signals may be classified as being road noise signals because each sensor of the sensors of a hydrophone assembly are offset in time in the same direction. Since the road noise is received by sensor number 8 before being received by the other sensors (sensors 7 through 1), the road noise may have been generated by an upper end of a hydrophone assembly bumping or rubbing into structures in a wellbore structure or any other far source above the tool which is not of interest for the measurement at this height.

Graph 450 includes line 460 that has a slope associated with road noise that moves down a wellbore at a velocity that corresponds to the slope of line 460 and distances between respective sensors 1 through 8 of the hydrophone assembly. Since methods of the present disclosure may align road noise associated with different hydrophone sensors with timing offsets and velocity of the road noise and since such signals, when aligned, are assigned wavenumber of zero (k=0), the slope of line 460 corresponds to the k=0 wavenumber (wavenumber zero) on the aligned frame of reference. Since the slope of line 430 is the same as the slope of line 460 and since slope 430 corresponds to the speed at which data associated with sensors 1 through 5 of a hydrophone assembly, the data associated with sensors 1 through 5 will also correspond to wavenumber zero (k=0).

Figure 5:
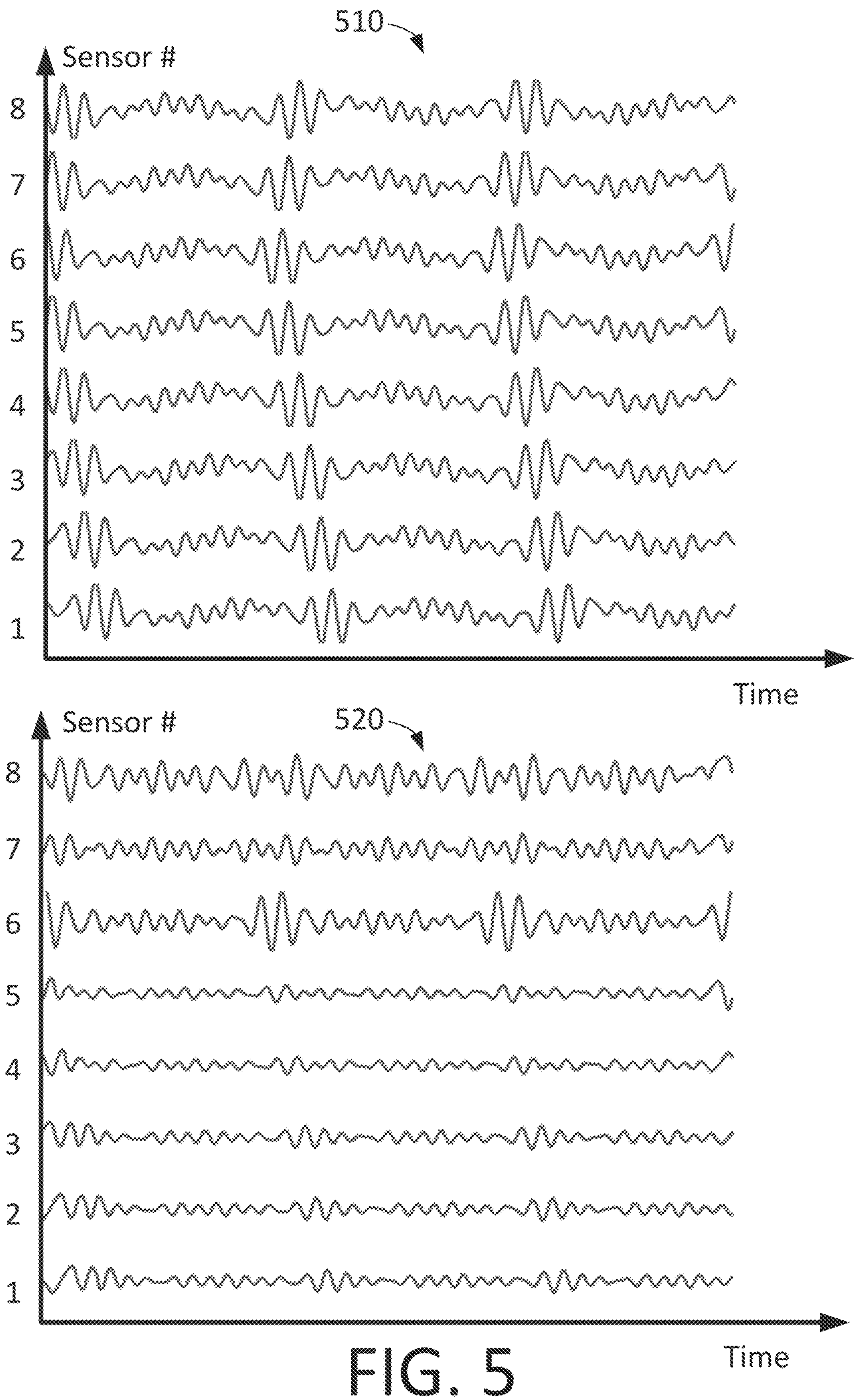
FIG. 5 includes two different graphs that each depict recovered waveforms attributable to two differing methods that attenuate or remove road noise signals from data associated with sensors of a hydrophone assembly, in accordance with various aspects of the subject technology.

FIG. 5 includes two different graphs that each depict recovered waveforms attributable to two differing methods that attenuate or remove road noise signals from data associated with sensors of a hydrophone assembly. Graph 510 illustrates signals identified using a method consistent with the present disclosure and graph 520 illustrates signals identified using a method that may be considered a naive method. Note the signals included in graph 510 of FIG. 5 closely track the signals in graph 410 of FIG. 4. In contrast, the signals included in graph 520 of FIG. 5 do not closely track the signals in graph 410 of FIG. 4. Once again vertical axes of FIG. 5 identify sensor numbers and the horizontal axes of FIG. 5 represent time.

Figure 6:
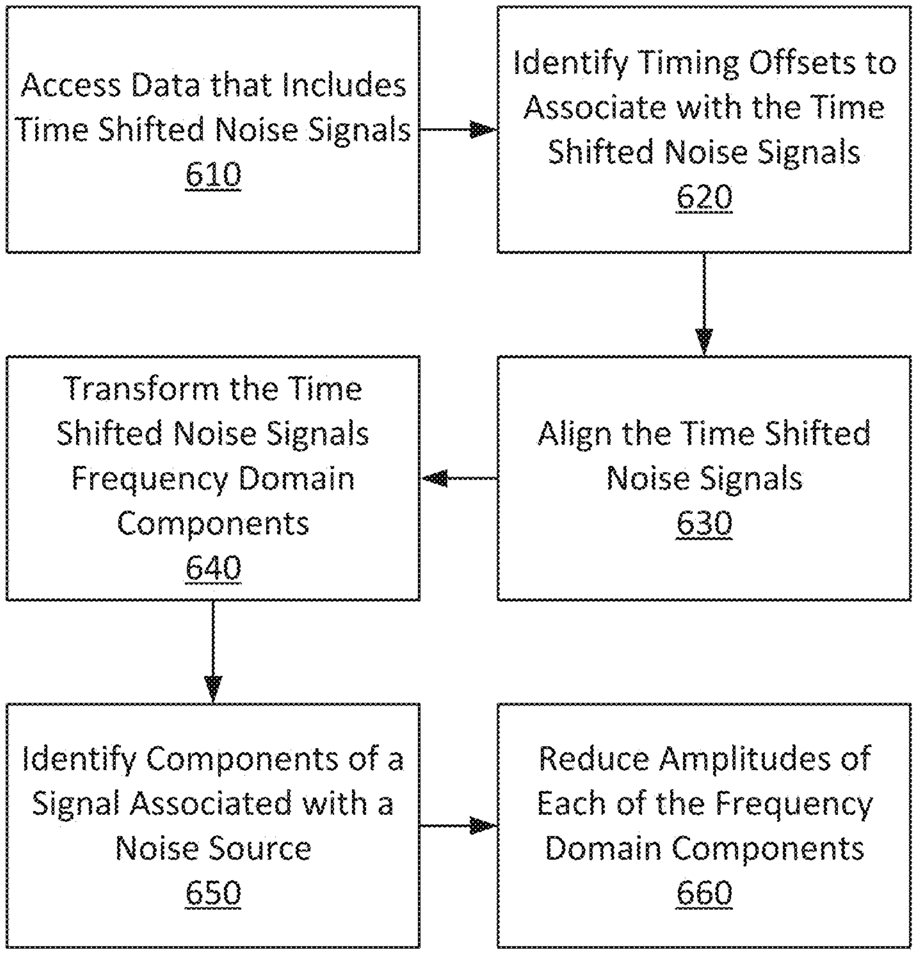
FIG. 6 illustrates actions that may be performed when noise associated with movement of a hydrophone assembly are attenuated, in accordance with various aspects of the subject technology.

FIG. 6 illustrates actions that may be performed when noise associated with movement of a hydrophone assembly are attenuated. At block 610, data that includes time shifted noise signals may be accessed. This data may be representative of data sensed by a hydrophone assembly. The accessed data may be data that was recorded by a hydrophone assembly, it may be data generated in a laboratory, it may be data generated by engineers (e.g., synthetic data), or the data may have been generated by a combination of these techniques. In certain instances, the collected data may have been collected or otherwise generated when a computer model is trained and/or validated based on experiments conducted in a wellbore or in a laboratory.

At block 620, the accessed data may be evaluated to identify timing offsets to associate with each of a set of noise signals. As mentioned above, the propagation of the signals through walls of a tube or a casing or through a fluid medium may correspond to the speed of sound. Each of these signals may be associated with a set of sensors of a hydrophone assembly that are separated from adjacent sensors by known distances. At block 630 the time shifted noise signals may be aligned. The actions discussed in respect to blocks 620 and 630 may include actions discussed in respect to FIG. 7 below.

Here again signals may be aligned with timing offsets that correspond to the actual velocity that sound waves move through the wall of a tube or casing or through a fluid medium of the wellbore. At block 640, the time shifted noise signals may be transformed into a domain that separates road noise from data and may include a frequency domain. For example, the time shifted noise signals may be transformed from the time-depth domain to the frequency-wavenumber (FK) domain, which includes components of time and space into the frequency domain that includes spectral content (frequencies and amplitudes) for each frequency of that spectral content.

The transformed time shifted noise signals may include a set of frequencies characteristic of noise generated by movement of the hydrophone assembly along the wellbore structure (road noise). A set of frequencies characteristic of road noise have been previously identified. As such, road noise may have a specific spectral signature. Some examples of road noise include a set of localized pulses of relatively high intensity/power and relatively low-frequency "humming" noises. Localized pulses of noise may consist of a series of broadband spikes generated when a tool bumps into a structure in a wellbore. Humming types of road noise may have traveled from sources that are distant from a wellbore that travel more efficiently through subterranean structures because they include spectral content (frequencies) that tend not to attenuate as fast as other, relatively higher frequencies. While both humming background noise and localized pulse noise are both unwanted noises, localized pulses of noise may contaminate the power spectral density of a signal more significantly than the humming background noise.

In certain instances, road noise can be created by a centralizer (e.g., a device that centers the hydrophone assembly in a tube), a cable, or any part of a tool string that scratches against a wellbore casing or tube. Road noise may also be generated by located at the surface or by a piece of down hole equipment. As such, road noise may be referred to as "tool related noise."

A signature of a set of localized pulses may include a plurality of sounds with a given spectral content (e.g., range of frequencies) that have a measured power greater than a threshold value. This localized set of pulses may also be limited to a duration that is less than a designated time span. A signature of background humming noises may persist continuously for longer than a threshold measure of time and may have a power that is less than a power threshold associated with background humming noises.

Once amplitudes and frequencies of the aligned time sifted noise signals are identified, amplitudes of each of those frequences that correspond to that road noise in a given instance may be identified. Components of a signal associated with a noise source of interest (e.g., a leak in a wellbore casing or tubing that is a noise other than "tool related noise") may be identified at block 650. Amplitudes of each of the frequencies that correspond to a road noise signature may be reduced at block 660.

Figure 7:
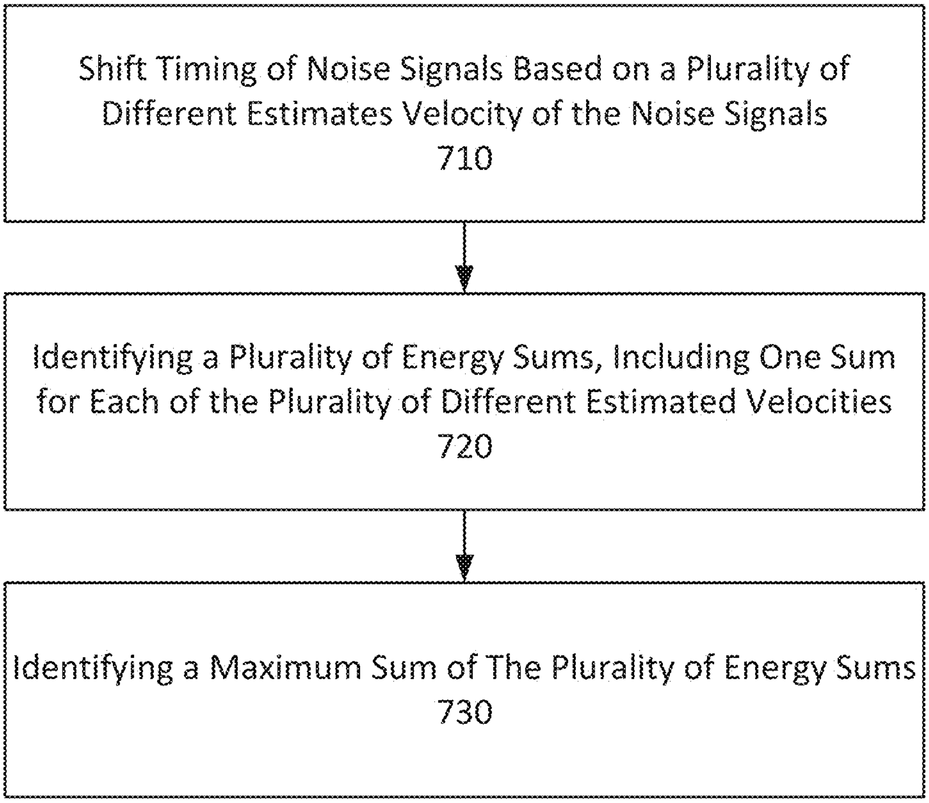
FIG. 7 includes actions that may be performed to identify timing offsets discussed in respect to FIG. 6, in accordance with various aspects of the subject technology.

FIG. 7 includes actions that may be performed to identify timing offsets discussed in respect to FIG. 6. Such actions may include evaluations that may be performed to identify the timing offsets (such as the timing offsets of FIG. 3). At block 710, a series of different time shifts may be applied to align time shifted noise signals included in a set of data (e.g., the data accessed discussed in respect to FIG. 6). Each different time shift may correspond to a variation in an estimated velocity of sound. As mentioned above, the velocity of sound may vary based on temperature, materials of a casing or tube, and/or a fluid medium of the casing or tubing. When each of the sensors of a hydrophone assembly are separated from an adjacent sensor by the same distance, each respective road noise signal will be separated by a same time offset. For example, when the speed of sound along the wellbore is 2.778 centimeters (cm) per second(s) (1000 meters per hour) and each of the sensors are deployed along the wellbore every 2 cm, the time shift to align each respective signal is about 3.6 milliseconds (ms). The speed of sound used for evaluations may be based on an estimate and may be varied according to increments that subdivide that estimate over a range of estimated times. Each of these estimated times may correspond to an estimated velocity or velocity adjustment.

Figure 8:
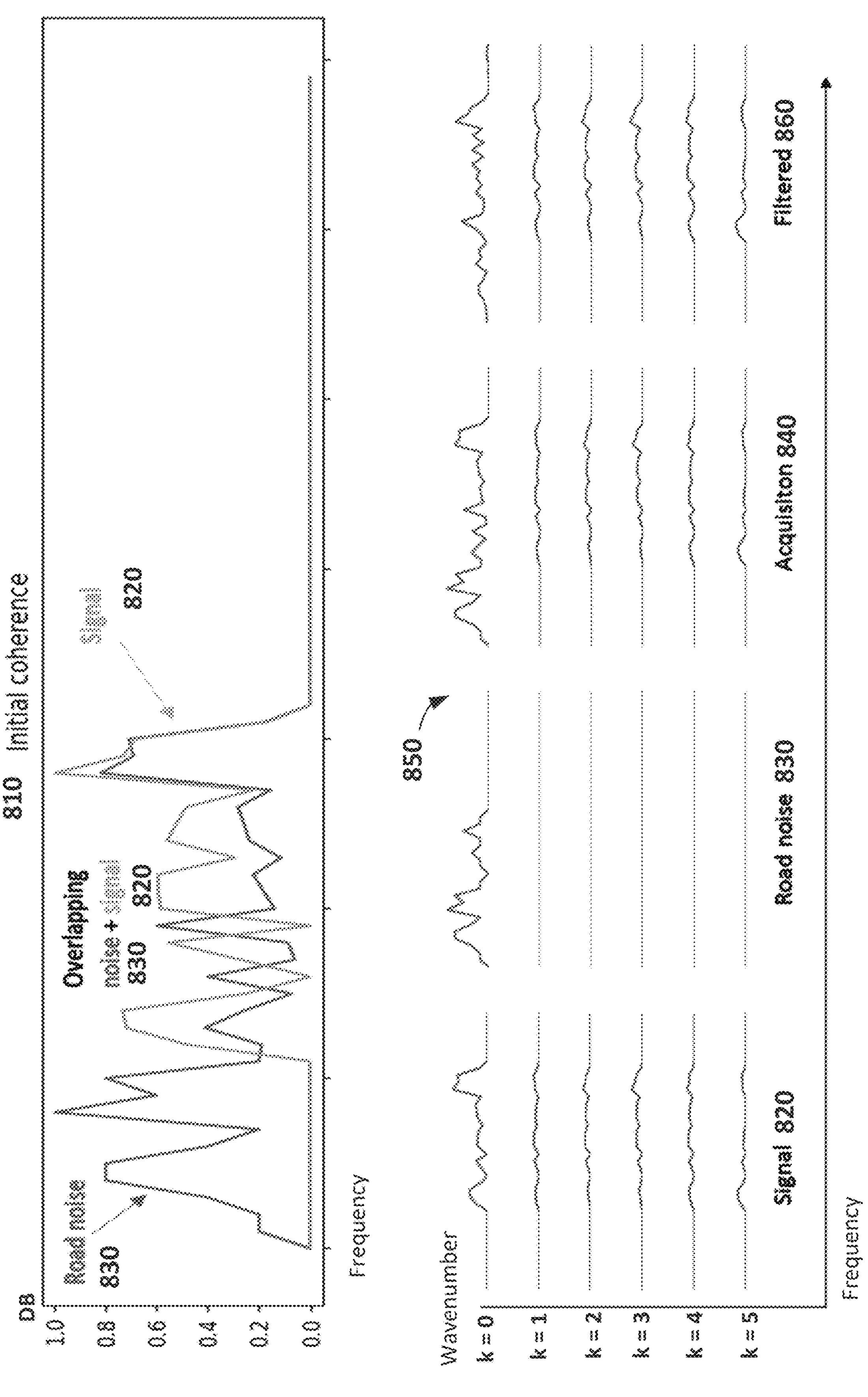
FIG. 8 includes a first graph and a second graph that both show overlapping spectral content associated with two different noise sources, in accordance with various aspects of the subject technology.

FIG. 8 includes a first graph and a second graph that both show overlapping spectral content associated with two different noise sources. The first graph 810 of FIG. 8 includes a first curve that includes spectral content of noise generated by motion of a hydrophone assembly (road noise) 830 and a second curve that includes spectral content of a signal of interest 820. The first graph 810 has a vertical access of amplitude measured in decibels (DB) and a horizontal access of frequency. The curves of graph 810 show a significant portion of the road noise 830 is located at relatively lower frequencies. Graph 810 also shows that above a certain frequency, that noise includes content of both road noise 830 and a signal of interest 820.

The second graph 850 of FIG. 8 illustrates the signal of interest 820, road noise 830, acquired data 840, and filtered data 860 for different wavenumbers (k=0 through k=5). As mentioned above in respect to FIGS. 3 and 4, noise that moves from the lower end of the hydrophone assembly toward the upper end of the hydrophone assembly or vice versa (from the upper end to the lower end of the hydrophone assembly) may be assigned to wavenumber zero (k=0). This is shown in graph 850 by both the signal 820 of interest curves and the road noise curve 830.

Graph 850 also shows that noise associated with the signal 820 of interest includes energy associated with wavenumbers other than zero (e.g., wavenumbers k=1 through k=5). Each of these different wavenumbers may correspond to sound energy propagating to different sensors at times that are not consistent with road noise. Each different wavenumber may correspond to a different point at which the slope of a line associated with motion of a signal of interest changing from a positive slope to a negative slope or vice versa (from a negative slope to a positive slope).

Graph 850 shows that while most of the energy associated with signal 820 corresponds to wavenumber zero (k=0), some of the energy of from a source of signal 820 is associated with other wavenumbers (1 through 5). While one might expect that a leak in a wellbore tube or casing be a point noise source that only has energy associated with two different wavenumbers, a leak may extend over a distance that is longer than a distance that separates one sensor from another and this may result in a signal of interest being associated with more than two wavenumbers. Other factors that could potentially result in a signal of interest being associated with more than two wavenumbers are echoes of the signal of interest. Noise signals associated with a leak may be vertically aligned and may emanate from a point that is close to a tool (e.g., within less than the length of a hydrophone array). A noise signal may arrive at a hydrophone assembly in the form of an approximately circular wavefront that may have a hyperbolic shape. Such a hyperbolic shape may appear as converging lines in a set of synthetic data based on limitations associated with a number of sensors that a hydrophone assembly has. For example, a hydrophone assembly that includes 8 sensors may sense acoustic waves as a set of converging lines even when the acoustic waves really have a shape more consistent with a hyperbola. As a result of not being linearly delayed, a signal of interest may be "spread out" over a range of values of wavenumber k. In such instances, a linear shift in a received signal may help separate road noise from signal noise.

Graph 850 shows that the road noise 830 energy is limited to wavenumber zero (k=0), as such the road noise of FIG. 8 does not include noise energy at wavenumbers that are not equal to zero (k≠0). The acquisition curves 840 of graph 850 include a combination of signal 820 and road noise 830 at wavenumber zero and include only signal 820 components at wavenumbers other than zero (k≠0 or wavenumbers 1 through 5 of FIG. 8). Evaluations may be performed to identify estimates of road noise versus signal 820 of interest noise at wavenumber zero (k=0). This may result in energies (amplitudes) associated with road noise and road noise frequencies being estimated. This may also result in energies associated with a signal of interest and wavenumber zero (k=0) being estimated. Once such estimates have been identified, amplitudes of signals at specific frequencies associated with wavenumber zero (k=0) may be used to reduce amplitudes of those signals at the specific frequencies associated with wavenumber zero (k=0). As such, amplitudes of energy associated with road noise may be reduced as discussed in respect to actions performed at block 650 of FIG. 6. This process may include evaluating energies to associate with data associated with wavenumbers other than zero (k≠0).

Estimates of energies associated with signals 820 of interest may be identified and data associated with the signal of interest may be averaged and normalized when reconstructed signals are generated. Collected data may be evaluated such that images may be constructed or the data may be interpreted as a set of power spectral density plots. Plots from the sensors of a hydrophone assembly may be aggregated by averaging signals from each sensor of the hydrophone assembly. Since, such plots are sensitive to being contaminated (in the frequency domain) by spectral content of road noise, density plots for each depth of a wellbore may be evaluated when only spectral content associated with road noise can be eliminated from a dataset. Data consistent with spectral content of known road noise signatures may be removed from the dataset.

The filtered curves 860 of graph 850 may be associated with data that has been filtered and normalized and inverse transforms and knowledge of signal propagation may be applied to this data when timing curves of graph 510 of FIG. 5 are generated.

The signals of graph 520, where naive averaging is used to identify signals received at each of a set of sensors (1 through 8), may be inherently flawed. For example, removing all k=0 content from a dataset may result in distortions that may make evaluations unreliable because doing so may also eliminate data that characterizes at least part of a signal of interest. In contrast, averaging and normalization techniques of the present disclosure may generate more accurate representations of signals of interest received at each respective sensor of a hydrophone assembly. Plots of road noise curve 830 and signal noise curve 820 of graph 810 may be evaluated to identify portions of content of curves 830 and 820 that overlap as part of an averaging and normalization process. This may include identifying content that has a wavenumber other than zero (k≠0) in order to estimate magnitudes of data that has a wavenumber of 0 (k=0) to keep in the dataset. As such, averaging and normalization techniques of the present discourse may be used to generate the curves of graph 510 of FIG. 5 in a manner that is not possible using naive filtering alone.

Figure 9:
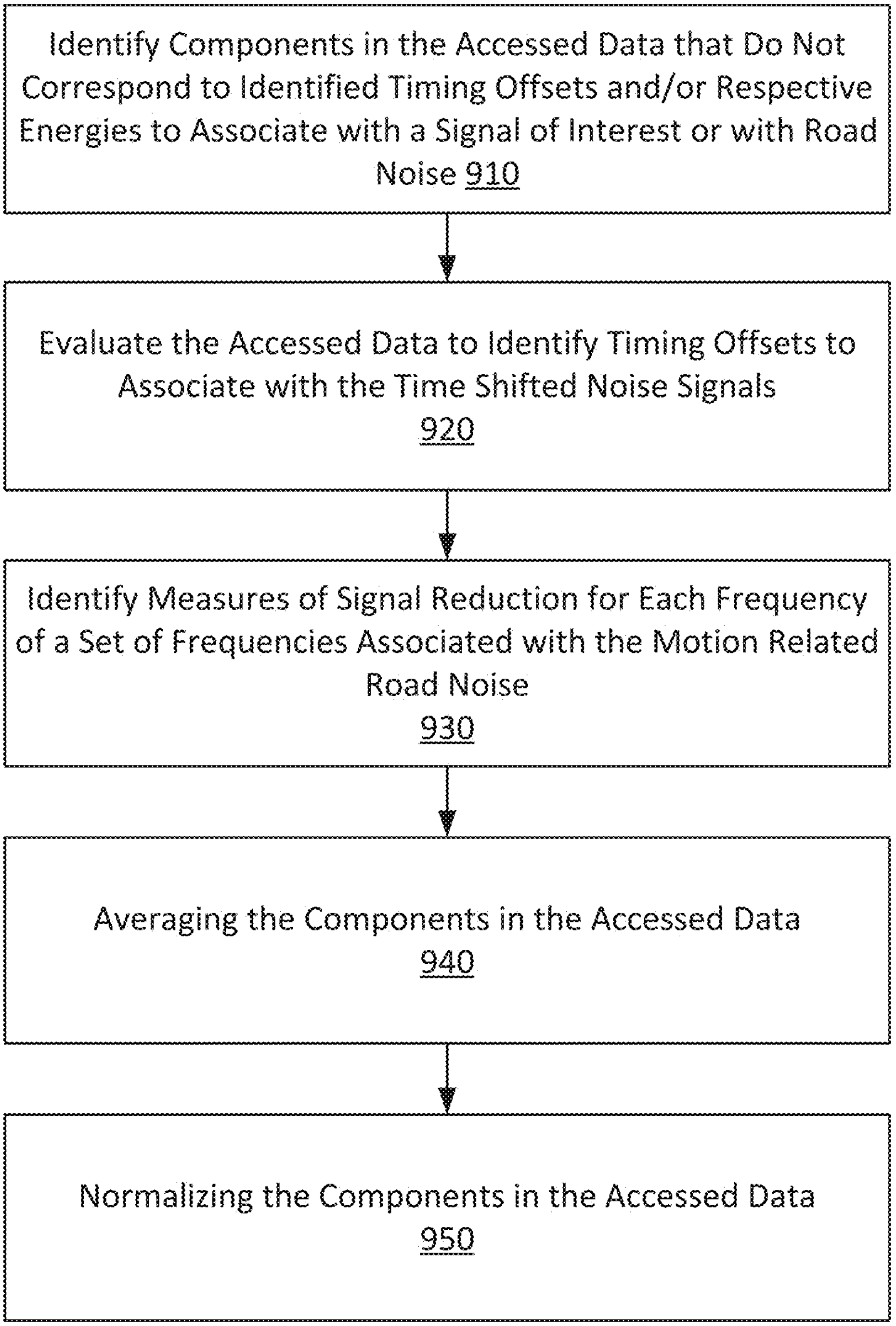
FIG. 9 illustrates actions that may be performed when road noise is separated from a signal of interest and when signals of interest are processed to generate reconstructed signals of interest, in accordance with various aspects of the subject technology.

FIG. 9 illustrates actions that may be performed when road noise is separated from a signal of interest and when signals of interest are processed to generate reconstructed signals of interest. At block 910, components in a set of accessed data that do not correspond to the identified timing offsets may be identified. These components may be associated with wavenumbers other than zero (k≠0) and they may include both amplitudes of a signal of interest at specific frequencies. Alternatively, or additionally, actions performed at block 910 may identify energies to associate with the signal of interest or with road noise at wavenumber zero (k=0). At block 920, an evaluation may be performed to identify the timing offsets discussed in respect to graph 330 of FIG. 3. At block 930, measures of signal reduction for each frequency of motion related road noise may be identified. Amplitudes of noise attributed to road noise (frequencies characteristic of road noise) may be removed as discussed in respect to FIGS. 6 and 8 of this disclosure.

At block 940, components in the accessed data that are attributed to a signal of interest may be averaged and at block 950, components included in the accessed data may be normalized. Here again, normalization may be based on known characteristics and/or an estimate of attenuation of a signal of interest over distance. In certain instances, different attenuation factors may be used for different spans of frequencies. For example, frequencies above a threshold frequency may be assigned with an attenuation factor that is greater than an attenuation factor of frequencies below that threshold frequency or another threshold frequency. In certain instances, multiple attenuation factors may be used based on knowledge of how sound of respective frequencies are attenuated over distance through a medium (e.g., a wellbore tubing or casing, a fluid medium, or combination thereof). In such instances, an attenuation factor associated with frequencies that are lower than a threshold frequency may be smaller than an attenuation factor associated with frequences above that threshold.

Figure 10:
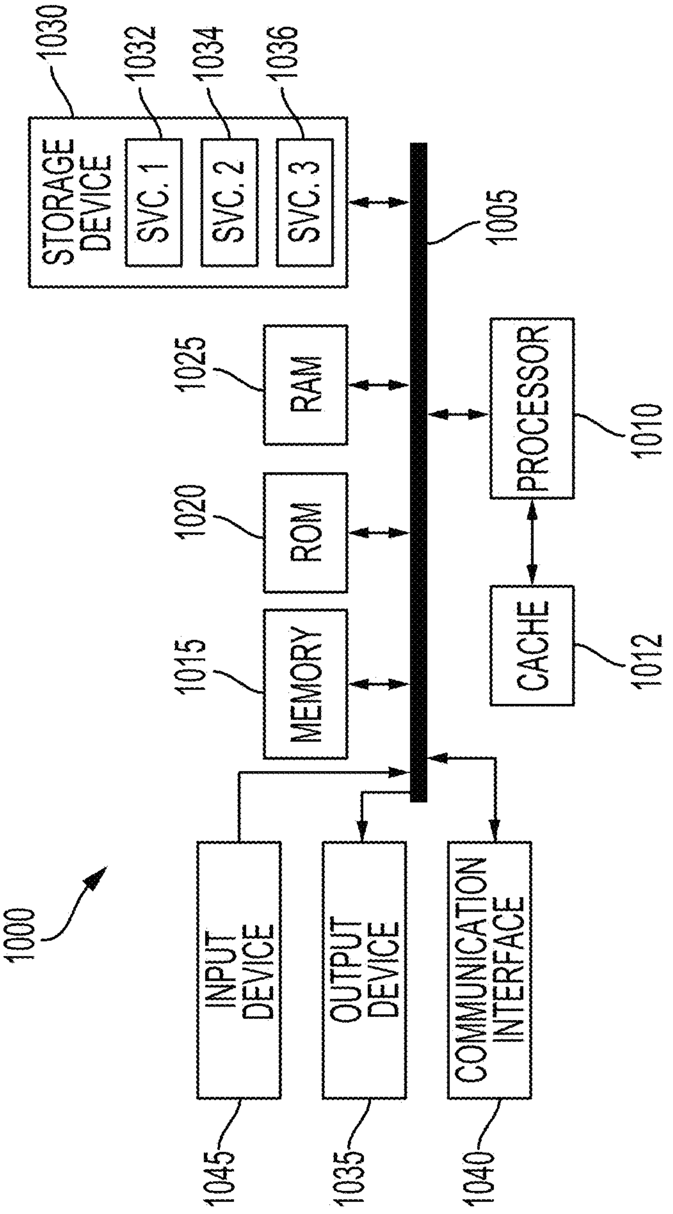
FIG. 10 illustrates an example computing device architecture which can be employed to perform any of the systems and techniques described herein.

FIG. 10 illustrates an example computing device architecture which can be employed to perform any of the systems and techniques described herein. In some examples, the computing device 1000 architecture can be integrated with tools described herein. The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics. The processor 1010 can include any general-purpose processor and a hardware or software service, such as service 1 1032, service 2 1034, and service 3 1036 stored in storage device 1030, configured to control the processor 1010 as well as a special-purpose processor where software instructions are incorporated into the processor design. The processor 1010 may be a self-contained system, containing multiple cores or processors, a bus, memory controller, cache, etc. A multi-core processor may be symmetric or asymmetric.

To enable user interaction with the computing device architecture 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art, such as a display, projector, television, speaker device, etc. In some instances, multimodal computing devices can enable a user to provide multiple types of input to communicate with the computing device architecture 1000. The communications interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. The storage device 1030 can include services 1032, 1034, 1036 for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

For clarity of explanation, in some instances the present technology may be presented as including individual functional blocks including functional blocks comprising devices, device components, steps or routines in a method implemented in software, or combinations of hardware and software.

In some instances, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples and aspects thereof, but those skilled in the art will recognize that the application is not limited thereto. Thus, while illustrative examples and aspects of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, examples and aspects of the systems and techniques described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Methods and apparatus of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Such methods may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative Statements of the disclosure include:

Statement 1: A method comprising: accessing data associated with distributed sensors of a hydrophone assembly deployed in a wellbore structure, the accessed data including time shifted noise signals for respective sensors of the distributed sensors; evaluating the accessed data to identify timing offsets to associate with the time shifted noise signals for each of the respective sensors, the identified offsets corresponding to a velocity that the time shifted noise signals propagate along the wellbore structure; aligning the time shifted noise signals according to the identified timing offsets; transforming the aligned noise signals into a domain that includes a frequency component, wherein: the transformed aligned noise signals include a set of frequencies characteristic of a tool related noise source; and the set of frequencies characteristic of the tool related noise source includes an amplitude for each frequency of the set of frequencies characteristic of the tool related noise source; identifying components of a signal associated with a noise source other than the tool related noise source; and reducing the amplitudes for each of the frequencies of the set of frequencies.

Statement 2: The method of Statement 1, wherein the evaluation of the accessed data to identify the timing offsets to associated with the time shifted noise signals includes: shifting timing of the noise signals based on a plurality of different estimated velocities of the time shifted noise signals propagating along the wellbore structure, wherein each respective velocity of the different estimated velocities corresponds to a different time delay performing energy calculations for each of the respective velocities based on the different time delays; and identifying a maximum energy yielded from the energy calculations, wherein the timing offsets associated with the time shifted noise signals is identified based on the maximum energy yielded from the energy calculations.

Statement 3: The method of Statements 1 or 2, further comprising: performing an evaluation to identify components in the accessed data that do not correspond to the identified timing offsets; and identifying the reduction of the amplitudes for each of the frequencies of the set of frequencies, wherein the reduction of the amplitudes is limited by data associated with the components in the accessed data that do not correspond to the identified timing offsets.

Statement 4: The method of Statement 3, further comprising: associating the velocity with a wavenumber of zero; identifying the components included in the accessed data that do not correspond to the identified timing offsets; and associating the components included in the accessed data to a wavenumber other than the wavenumber of zero.

Statement 5: The method of Statement 3, further comprising averaging the components included in the accessed data.

Statement 6: The method of any of Statements 1 through 5, further comprising normalizing the components included in the accessed data.

Statement 7: The method of any of Statements 1 through 6, wherein: time shifted versions of the signal are respectfully associated with a first sensor, a second sensor, and a third sensor of the distributed sensors, and the signal associated with the noise source is sensed by the second sensor before it is received by the sensor, and is sensed by the third sensor after it is received by the sensor.

Statement 8: A non-transitory computer-readable storage medium having embodied thereon instructions executable by one or more processors to implement a method, the method comprising: accessing data associated with distributed sensors of a hydrophone assembly deployed in a wellbore structure, the accessed data including time shifted noise signals for respective sensors of the distributed sensors; evaluating the accessed data to identify timing offsets to associate with the time shifted noise signals for each of the respective sensors, the identified offsets corresponding to a velocity that the time shifted noise signals propagate along the wellbore structure; aligning the time shifted noise signals according to the identified timing offsets; transforming the aligned noise signals into a domain that includes a frequency component, wherein: the transformed aligned noise signals include a set of frequencies characteristic of a tool related noise source; and the set of frequencies characteristic of the tool related noise source includes an amplitude for each frequency of the set of frequencies characteristic of the tool related noise source; and identifying components of a signal associated with a noise source other than the tool related noise source; reducing the amplitudes for each of the frequencies of the set of frequencies.

Statement 9: The non-transitory computer-readable storage medium of Statement 8, wherein the evaluation of the accessed data to identify the timing offsets to associated with the time shifted noise signals includes: shifting timing of the noise signals based on a plurality of different estimated velocities of the time shifted noise signals propagating along the wellbore structure, wherein each respective velocity of the different estimated velocities corresponds to a different time delay; performing energy calculations for each of the respective velocities based on the different time delays; and identifying a maximum energy yielded from the energy calculations, wherein the timing offsets associated with the time shifted noise signals is identified based on the maximum energy yielded from the energy calculations.

Statement 10: The non-transitory computer-readable storage medium of Statement 8 or 9, wherein the one or more processors executes the instructions to: perform an evaluation to identify components in the accessed data that do not correspond to the identified timing offsets; and identify the reduction of the amplitudes for each of the frequencies of the set of frequencies, wherein the reduction of the amplitudes is limited by data associated with the components in the accessed data that do not correspond to the identified timing offsets.

Statement 11: The non-transitory computer-readable storage medium of Statement 10, wherein the one or more processors executes the instructions to: associate the velocity with a wavenumber of zero; identify the components included in the accessed data that do not correspond to the identified timing offsets; and associate the components included in the accessed data to a wavenumber other than the wavenumber of zero.

Statement 12: The non-transitory computer-readable storage medium of Statement 10, wherein the one or more processors executes the instructions to: average the components included in the accessed data.

Statement 13: The non-transitory computer-readable storage medium of any of Statements 8 through 12, wherein the one or more processors executes the instructions to: normalize the components included in the accessed data.

Statement 14: The non-transitory computer-readable storage medium of any of Statements 1 through 13, wherein: time shifted versions of the signal are respectfully associated with a first sensor, a second sensor, and a third sensor of the distributed sensors, and the signal associated with the noise source is sensed by the second sensor before it is received by the sensor, and is sensed by the third sensor after it is received by the sensor.

Statement 15: An apparatus comprising: a memory; and one or more processors that execute instructions out of the memory to: access data associated with distributed sensors of a hydrophone assembly deployed in a wellbore structure, the accessed data including time shifted noise signals for respective sensors of the distributed sensors, evaluate the accessed data to identify timing offsets to associate with the time shifted noise signals for each of the respective sensors, the identified offsets corresponding to a velocity that the time shifted noise signals propagate along the wellbore structure, align the time shifted noise signals according to the identified timing offsets, transform the time aligned noise signals into a domain that includes a frequency component, wherein: the transformed aligned noise signals include a set of frequencies characteristic of a tool related noise source, and the set of frequencies characteristic of the tool related noise source includes an amplitude for each frequency of the set of frequencies characteristic of the tool related noise source; identify components of a signal associated with a noise source other than the tool related noise source; and reduce the amplitudes for each of the frequencies of the set of frequencies.

Statement 16: The apparatus of Statement 15, wherein the evaluation of the accessed data to identify the timing offsets to associated with the time shifted noise signals includes: shifting timing of the noise signals based on a plurality of different estimated velocities of the time shifted noise signals propagating along the wellbore structure, wherein each respective velocity of the different estimated velocities corresponds to a different time delay; performing energy calculations for each of the respective velocities based on the different time delays; and identifying a maximum energy yielded from the energy calculations, wherein the timing offsets associated with the time shifted noise signals is identified based on the maximum energy yielded from the energy calculations.

Statement 17: The apparatus of Statement 15, wherein one or more processors execute instructions out of the memory to: perform an evaluation to identify components in the accessed data that do not correspond to the identified timing offsets; and identify the reduction of the amplitudes for each of the frequencies of the set of frequencies, wherein the reduction of the amplitudes is limited by data associated with the components in the accessed data that do not correspond to the identified timing offsets.

Statement 18: The apparatus of any of Statements 1 through 17, wherein one or more processors execute instructions out of the memory to: associate the velocity with a wavenumber of zero; identify the components included in the accessed data that do not correspond to the identified timing offsets; and associate the components included in the accessed data to a wavenumber other than the wavenumber of zero.

Statement 19: The apparatus of Statement 17, wherein one or more processors execute instructions out of the memory to average the components included in the accessed data.

Statement 20: The apparatus of any of Statements 15 through 19, wherein one or more processors execute instructions out of the memory to normalize the components included in the accessed data.

What is claimed is:

1. A method comprising:

accessing data associated with distributed sensors of a hydrophone assembly deployed in a wellbore structure, the accessed data including time shifted noise signals for respective sensors of the distributed sensors;

evaluating the accessed data to identify timing offsets to associate with the time shifted noise signals for each of the respective sensors, the identified offsets corresponding to a velocity that the time shifted noise signals propagate along the wellbore structure;

aligning the time shifted noise signals according to the identified timing offsets;

transforming the aligned noise signals into a domain that includes a frequency component, wherein:

the transformed aligned noise signals include a set of frequencies characteristic of a tool related noise source; and the set of frequencies characteristic of the tool related noise source includes an amplitude for each frequency of the set of frequencies characteristic of the tool related noise source;

identifying components of a signal associated with a noise source other than the tool related noise source, wherein the noise source comprises at least one of a fluid leak, a fluid movement, or a defect within the wellbore structure;

reducing the amplitudes for each of the frequencies of the set of frequencies characteristic of the tool related noise source to remove false-positive indications of fluid flows in the wellbore structure; and advancing a wellbore operation based on the reduced amplitude.

2. The method of claim 1, wherein the evaluation of the accessed data to identify the timing offsets to associated with the time shifted noise signals includes:

shifting timing of the noise signals based on a plurality of different estimated velocities of the time shifted noise signals propagating along the wellbore structure, wherein each respective velocity of the different estimated velocities corresponds to a different time delay;

performing energy calculations for each of the respective velocities based on the different time delays; and identifying a maximum energy yielded from the energy calculations, wherein the timing offsets associated with the time shifted noise signals is identified based on the maximum energy yielded from the energy calculations.

3. The method of claim 1, further comprising:

performing an evaluation to identify components in the accessed data that do not correspond to the identified timing offsets; and identifying the reduction of the amplitudes for each of the frequencies of the set of frequencies, wherein the reduction of the amplitudes is limited by data associated with the components in the accessed data that do not correspond to the identified timing offsets.

4. The method of claim 3, further comprising:

associating the velocity with a wavenumber of zero;

identifying the components included in the accessed data that do not correspond to the identified timing offsets; and associating the components included in the accessed data to a wavenumber other than the wavenumber of zero.

5. The method of claim 3, further comprising:

averaging the components included in the accessed data.

6. The method of claim 5, further comprising:

normalizing the components included in the accessed data.

7. The method of claim 1, wherein:

time shifted versions of the signal are respectfully associated with a first sensor, a second sensor, and a third sensor of the distributed sensors, and the signal associated with the noise source is sensed by the second sensor before it is received by the sensor, and is sensed by the third sensor after it is received by the sensor.

8. A non-transitory computer-readable storage medium having embodied thereon instructions executable by one or more processors to implement a method, the method comprising:

accessing data associated with distributed sensors of a hydrophone assembly deployed in a wellbore structure, the accessed data including time shifted noise signals for respective sensors of the distributed sensors;

evaluating the accessed data to identify timing offsets to associate with the time shifted noise signals for each of the respective sensors, the identified offsets corresponding to a velocity that the time shifted noise signals propagate along the wellbore structure;

aligning the time shifted noise signals according to the identified timing offsets;

transforming the aligned noise signals into a domain that includes a frequency component, wherein:

the transformed aligned noise signals include a set of frequencies characteristic of a tool related noise source; and the set of frequencies characteristic of the tool related noise source includes an amplitude for each frequency of the set of frequencies characteristic of the tool related noise source;

identifying components of a signal associated with a noise source other than the tool related noise source, wherein the noise source comprises at least one of a fluid leak, a fluid movement, or a defect within the wellbore structure;

reducing the amplitudes for each of the frequencies of the set of frequencies characteristic of the tool related noise source to remove false-positive indications of fluid flows in the wellbore structure; and advancing a wellbore operation based on the reduced amplitude.

9. The non-transitory computer-readable storage medium of claim 8, wherein the evaluation of the accessed data to identify the timing offsets to associated with the time shifted noise signals includes:

shifting timing of the noise signals based on a plurality of different estimated velocities of the time shifted noise signals propagating along the wellbore structure, wherein each respective velocity of the different estimated velocities corresponds to a different time delay;

performing energy calculations for each of the respective velocities based on the different time delays; and identifying a maximum energy yielded from the energy calculations, wherein the timing offsets associated with the time shifted noise signals is identified based on the maximum energy yielded from the energy calculations.

10. The non-transitory computer-readable storage medium of claim 8, wherein the one or more processors executes the instructions to:

perform an evaluation to identify components in the accessed data that do not correspond to the identified timing offsets; and identify the reduction of the amplitudes for each of the frequencies of the set of frequencies, wherein the reduction of the amplitudes is limited by data associated with the components in the accessed data that do not correspond to the identified timing offsets.

11. The non-transitory computer-readable storage medium of claim 10, wherein the one or more processors executes the instructions to:

associate the velocity with a wavenumber of zero;

identify the components included in the accessed data that do not correspond to the identified timing offsets; and associate the components included in the accessed data to a wavenumber other than the wavenumber of zero.

12. The non-transitory computer-readable storage medium of claim 10, wherein the one or more processors executes the instructions to:

average the components included in the accessed data.

13. The non-transitory computer-readable storage medium of claim 12, wherein the one or more processors executes the instructions to:

normalize the components included in the accessed data.

14. The non-transitory computer-readable storage medium of claim 8, wherein:

time shifted versions of the signal are respectfully associated with a first sensor, a second sensor, and a third sensor of the distributed sensors, and the signal associated with the noise source is sensed by the second sensor before it is received by the sensor, and is sensed by the third sensor after it is received by the sensor.

15. An apparatus comprising:

a memory; and one or more processors that execute instructions out of the memory to:

access data associated with distributed sensors of a hydrophone assembly deployed in a wellbore structure, the accessed data including time shifted noise signals for respective sensors of the distributed sensors, evaluate the accessed data to identify timing offsets to associate with the time shifted noise signals for each of the respective sensors, the identified offsets corresponding to a velocity that the time shifted noise signals propagate along the wellbore structure, align the time shifted noise signals according to the identified timing offsets, transform the time aligned noise signals into a domain that includes a frequency component, wherein:

the transformed aligned noise signals include a set of frequencies characteristic of a tool related noise source, and the set of frequencies characteristic of the tool related noise source includes an amplitude for each frequency of the set of frequencies characteristic of the tool related noise source;

identify components of a signal associated with a noise source other than the tool related noise source, wherein the noise source comprises at least one of a fluid leak, a fluid movement, or a defect within the wellbore structure;

reduce the amplitudes for each of the frequencies of the set of frequencies characteristic of the tool related noise source to remove false-positive indications of fluid flows in the wellbore structure; and advance a wellbore operation based on the reduced amplitude.

16. The apparatus of claim 15, wherein the evaluation of the accessed data to identify the timing offsets to associated with the time shifted noise signals includes:

shifting timing of the noise signals based on a plurality of different estimated velocities of the time shifted noise signals propagating along the wellbore structure, wherein each respective velocity of the different estimated velocities corresponds to a different time delay;

performing energy calculations for each of the respective velocities based on the different time delays; and identifying a maximum energy yielded from the energy calculations, wherein the timing offsets associated with the time shifted noise signals is identified based on the maximum energy yielded from the energy calculations.

17. The apparatus of claim 15, wherein one or more processors execute instructions out of the memory to:

perform an evaluation to identify components in the accessed data that do not correspond to the identified timing offsets; and identify the reduction of the amplitudes for each of the frequencies of the set of frequencies, wherein the reduction of the amplitudes is limited by data associated with the components in the accessed data that do not correspond to the identified timing offsets.

18. The apparatus of claim 17, wherein one or more processors execute instructions out of the memory to:

associate the velocity with a wavenumber of zero;

identify the components included in the accessed data that do not correspond to the identified timing offsets; and associate the components included in the accessed data to a wavenumber other than the wavenumber of zero.

19. The apparatus of claim 17, wherein one or more processors execute instructions out of the memory to average the components included in the accessed data.

20. The apparatus of claim 19, wherein one or more processors execute instructions out of the memory to normalize the components included in the accessed data.

* * * * *